March 20, 1945.  A. C. LIND ET AL  2,372,097
APPARATUS FOR APPLYING TRIM MOLDING
Original Filed Sept. 22, 1941  7 Sheets-Sheet 1

INVENTORS
ALVIN C. LIND
ALEXANDER CARLIN
BY
ATTORNEYS

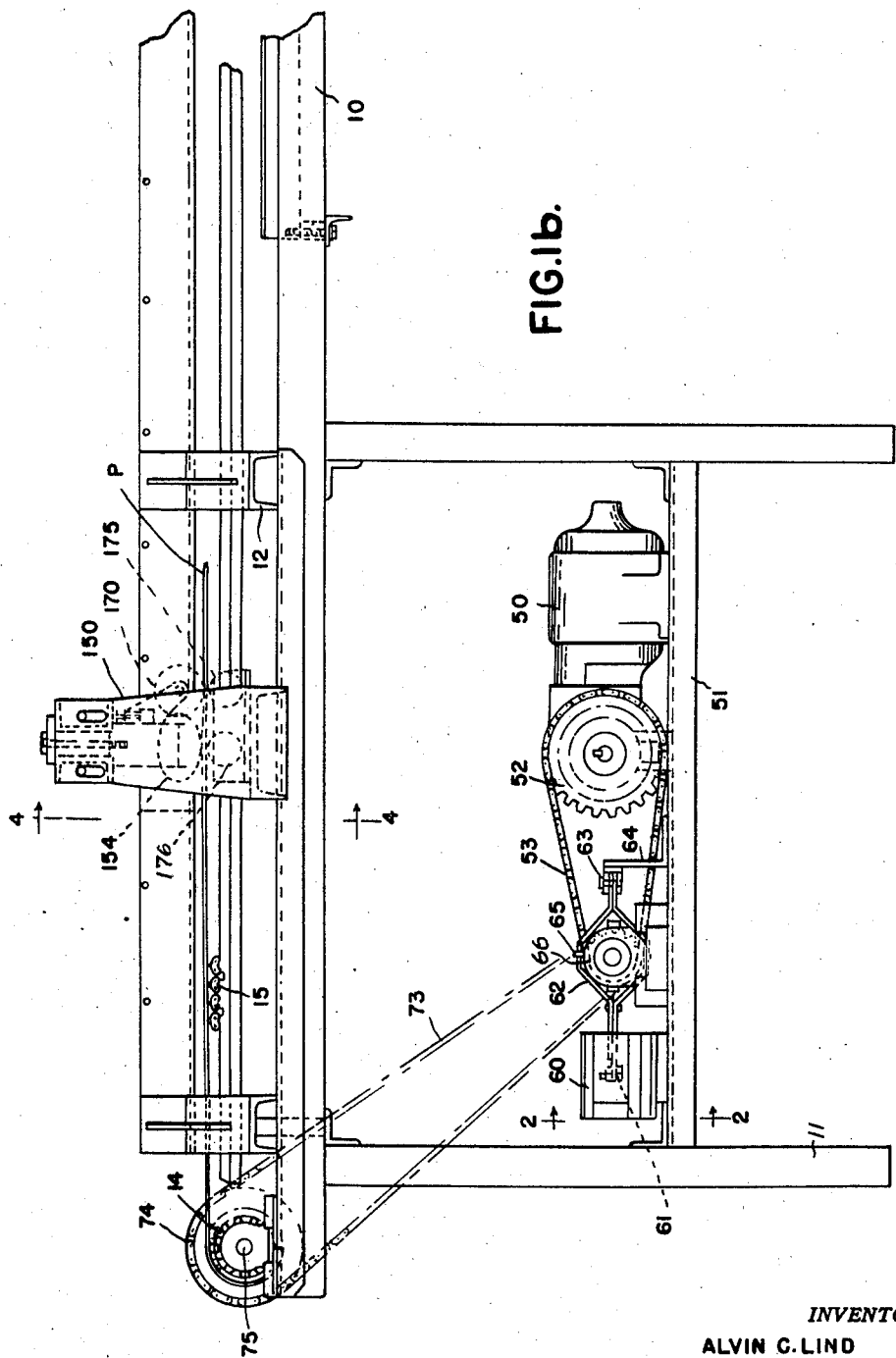

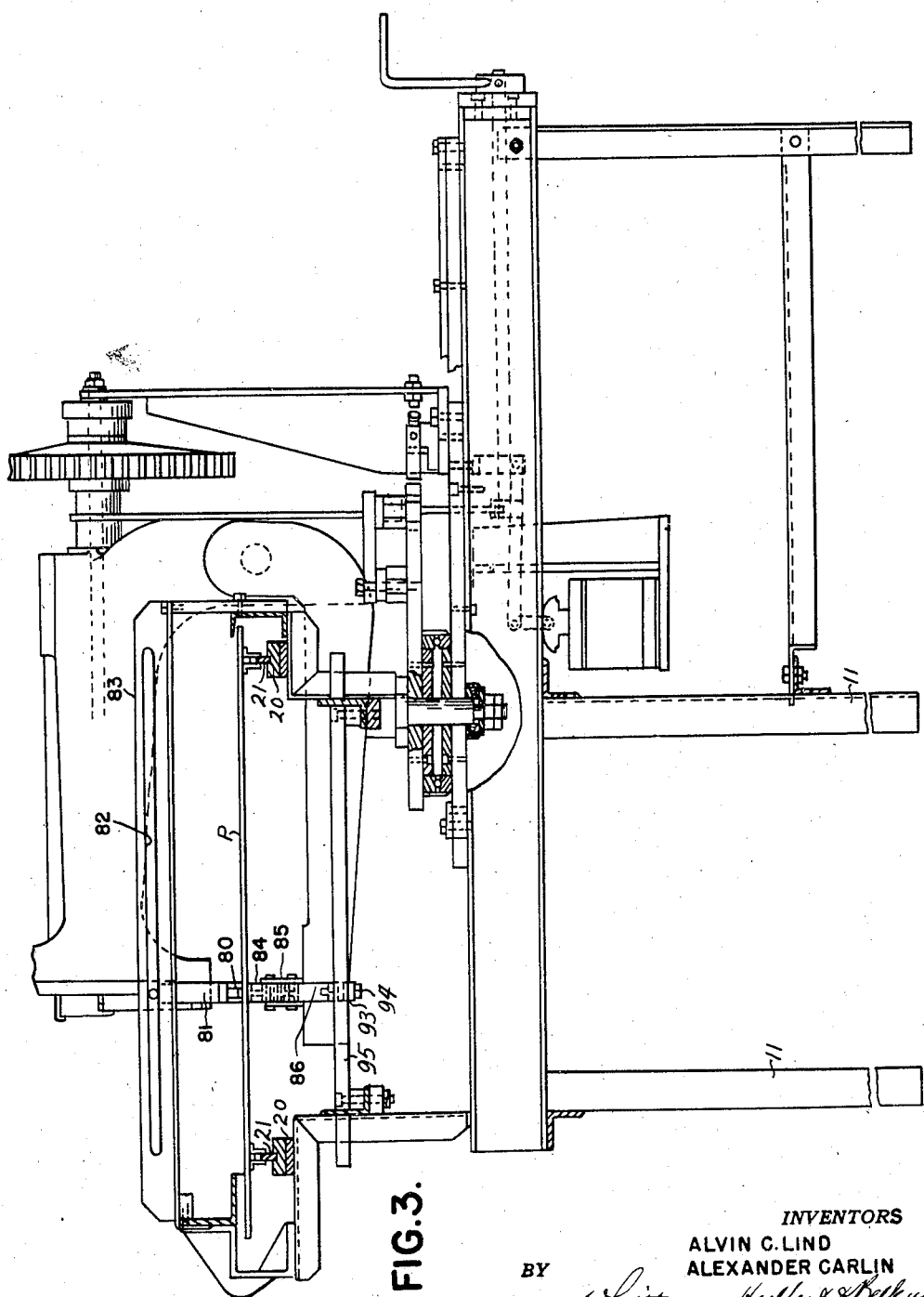

March 20, 1945.   A. C. LIND ET AL   2,372,097
APPARATUS FOR APPLYING TRIM MOLDING
Original Filed Sept. 22, 1941   7 Sheets-Sheet 5

INVENTORS
ALVIN. C. LIND
ALEXANDER CARLIN
BY
ATTORNEYS

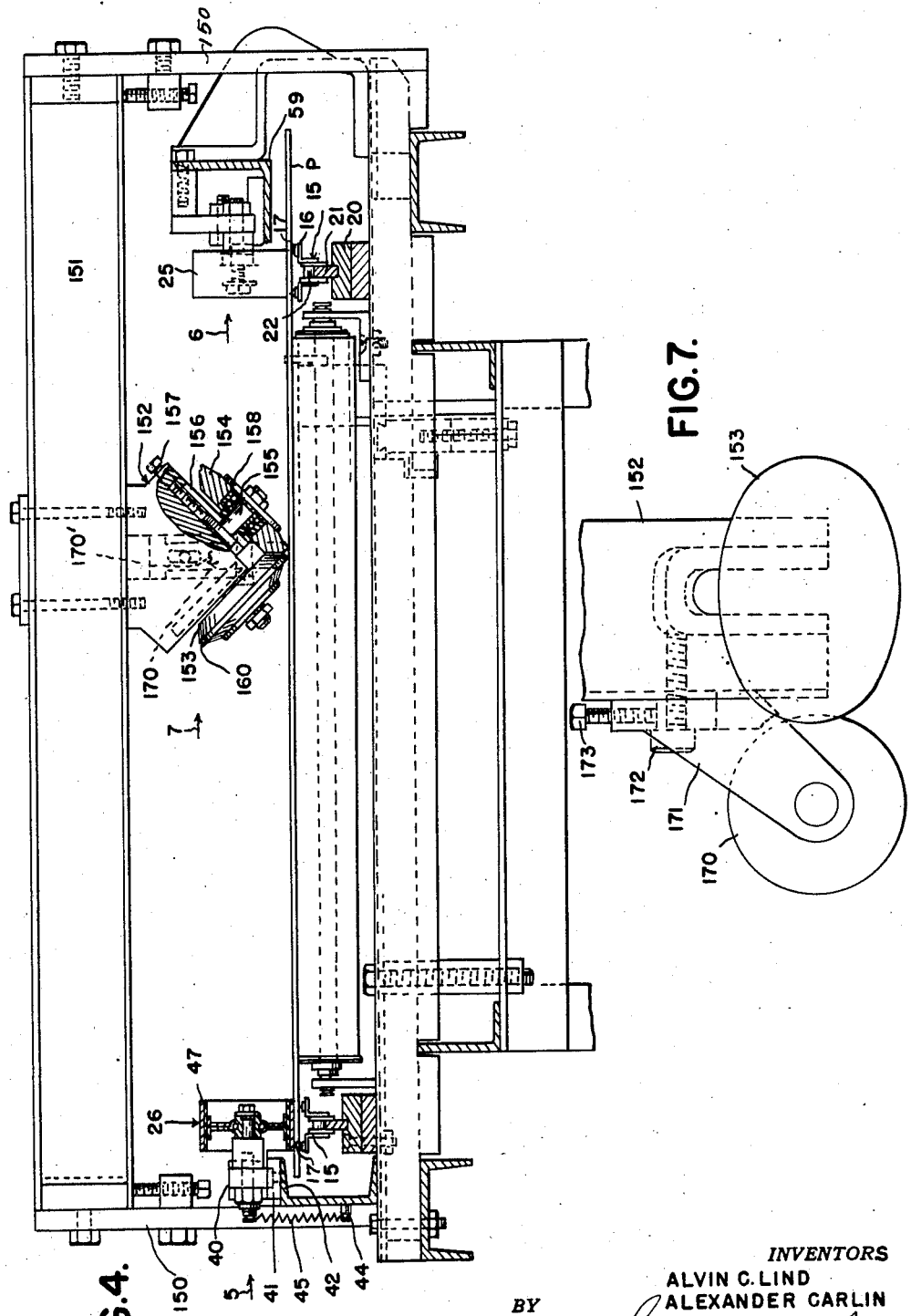

March 20, 1945. A. C. LIND ET AL 2,372,097
APPARATUS FOR APPLYING TRIM MOLDING
Original Filed Sept. 22, 1941   7 Sheets-Sheet 7
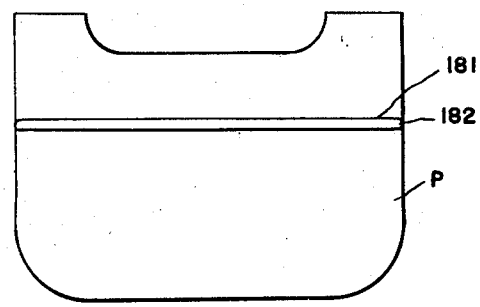
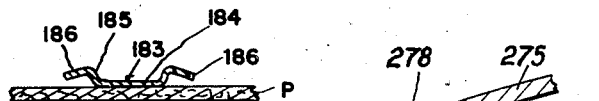
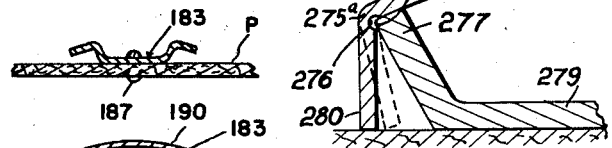
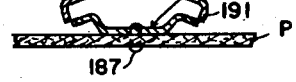
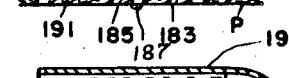
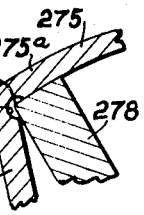
INVENTORS
ALVIN C. LIND
ALEXANDER CARLIN
BY
ATTORNEYS Patented Mar. 20, 1945

2,372,097

UNITED STATES PATENT OFFICE 2,372,097

APPARATUS FOR APPLYING TRIM MOLDING

Alvin C. Lind and Alexander Carlin, Detroit, Mich., assignors to National Automotive Fibres, Inc., Detroit, Mich., a corporation of Delaware Original application September 22, 1941, Serial No. 411,940. Divided and this application March 16, 1942, Serial No. 434,958

9 Claims. (Cl. 153—1)

The present invention relates to molding, and more particularly to apparatus for applying decorative trim molding such as is employed on trim panels in automotive vehicles.

This application is a division of our copending application, Serial No. 411,940, filed September 22, 1941, now Patent No. 2,362,909. The stapling mechanism illustrated in this application is embodied in a divisional application of Alvin C. Lind for "Stapling mechanism," filed September 8, 1942, bearing Serial No. 457,666.

Heretofore, a decorative effect has been imparted to interior trim panels, particularly of automotive vehicles, by providing a bead or molding strip which generally extends across the trim panel, but which may extend over any portion thereof in any desired direction. In the past these trim moldings have for the most part been formed of a bright metal, or have been chromium plated.

In the past, two general types of molding strips have been employed. In one a base strip, having flanges extending along the side, was secured to the panel board in any desired manner, after which a finishing cover strip was snapped over the flanges of the base strip. This type is open to the objection that it has proved impossible to provide a sufficiently secure interlock between the cover strip and the base strip and still retain the "snap-on" feature.

As an alternative of this type, it has been proposed in the past to provide a cover strip which, instead of snapping on, is slid on from one end of the base strip. This type is open to the serious objection that it is impossible to provide finished ends on the cover strip and still preserve the feature of sliding the cover strip on to a base strip.

The second type which has previously been employed, comprises a unitary finished article which is attached as a unit to the trim panel. This type may be made in several ways, one of which is to provide fastening elements directly on the inside of the molding. Another mode of making this second type of molding strip was to provide separate base strips and cover strips and to assemble the same prior to attaching the base strip to the trim panel. This type of molding strip is open to the objection that openings must be formed in the trim panel for the reception of the fastening elements carried by the molding strip, or, as an alternative, the exterior surface of the molding strip must be subjected to a blow or severe pressure to cause the fastening elements to penetrate the trim panel.

We have devised a new molding strip and apparatus for assembling the same with a trim panel. Briefly described, our invention comprises a base strip having laterally extending flanges, and a cover strip which is first adapted to be engaged with the base strip in registry therewith, and is then subjected to a rolling operation which bends flanges of the cover strip inwardly under the flanges of the base strip, so as to provide a definite and positive interlock between the parts.

According to the preferred embodiment of our invention the assembly of the trim panel and molding strip elements is carried out on an assembly line. The trim panels are advanced by means of conveyors underneath guides. The base strips are brought into engagement with the guides and are advanced through them, thereby aligning the base strips with great accuracy on the desired portion of the trim panels desired. As the base strips and the trim panels are continuously advanced, the base strips pass beneath a stapling device, or equivalent securing means, which locks the base strips to the trim panels. As the trim panel with the now permanently attached base strip advances further along the assembly line, the operator places the cover strip in registering relation over the base strip. Preferably the cover strip is formed so as to have a light snap-on engagement with the base strip. As the assembly continues to advance, the cover strip passes beneath a roller which is adapted to force the cover strip firmly down over the base strip. Immediately afterwards the cover strip passes past one, or between two or more oppositely directed rollers having flanges formed thereon which are adapted to force and permanently bend the flanges of the cover strip underneath the laterally extending flanges of the base strip, so as to provide a permanent and positive interlock.

By practicing the present invention, it is possible to form the cover strips in a continuous manner from the strip stock in which the material is cut off at the desired length, and the cut-off means may be adapted to form the end of the cover strip to a desirable conformation. Normally, it is desired to have the ends of the cover strips closed and smoothly rounded. The assembly with the trim panel is greatly facilitated, and the molding strips are applied with absolute uniformity, and with great rapidity. In addition, the number of operators required to apply the molding strips to the trim panels is reduced, particularly when it is recalled that in some previous methods the base strip and the molding strip were secured together prior to attachment, thereby requiring separate operations and separate operators.

With the foregoing general description in mind, it is an object of the present invention to provide a trim panel with a molding strip of any design.

It is a further object of the invention to provide novel apparatus for carrying out the method described.

Other objects of the invention will be apparent as the description proceeds, and when taken in conjunction with the accompanying drawings, wherein:

Figures 1a and 1b together form a side elevation of the apparatus employed;

Figure 3 is a vertical cross sectional view through the structure in Figure 1a;

Figure 1A:
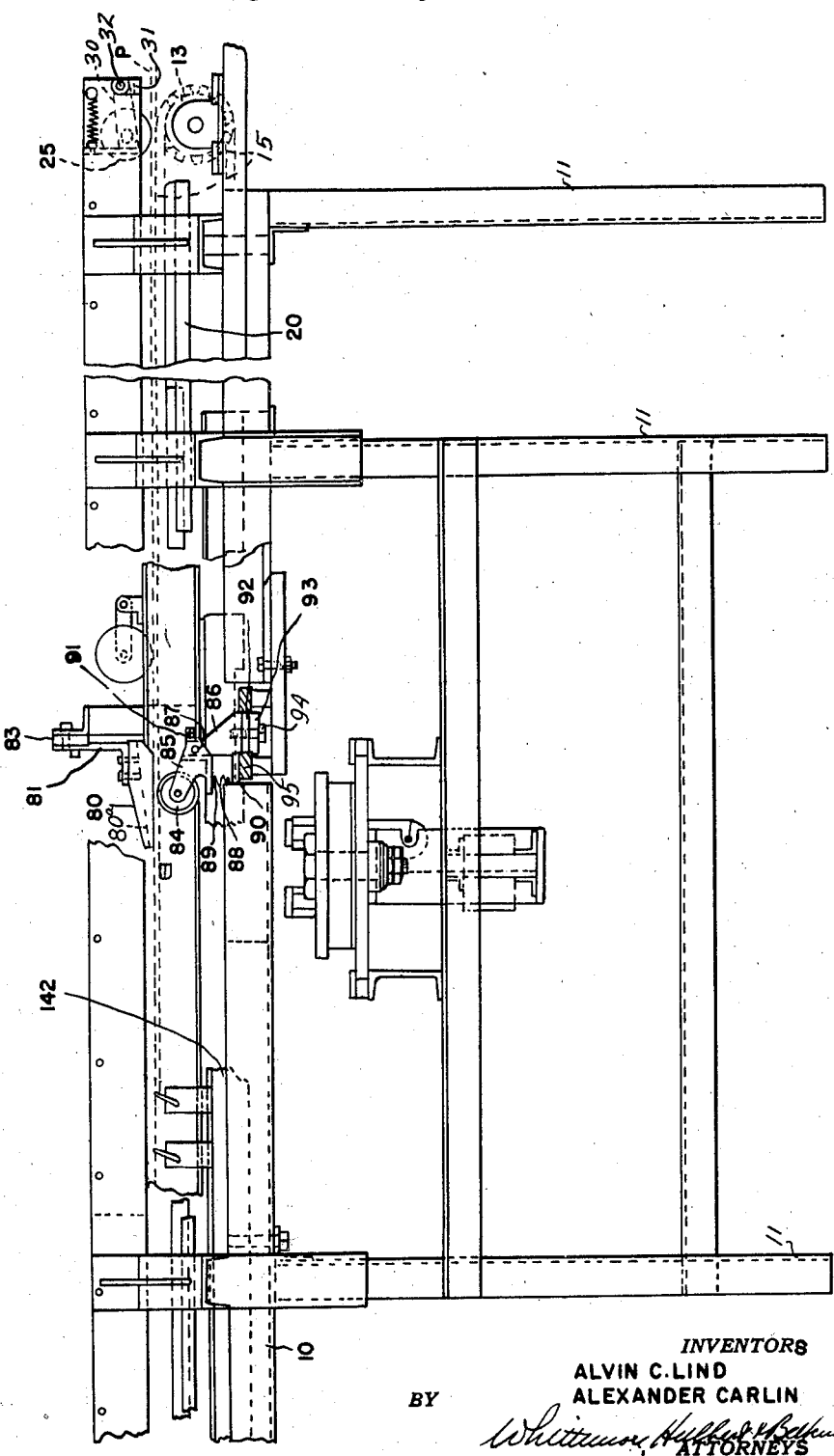
Figure 2:
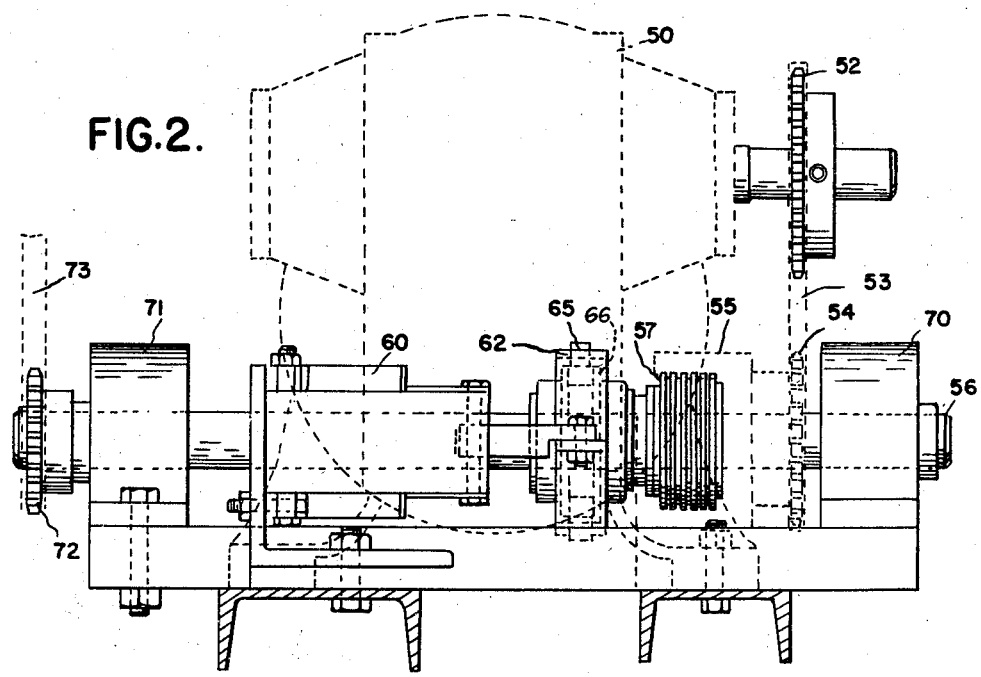
Figure 2 is a fragmentary section on the line 2—2, Figure 1b.
Figure 6:
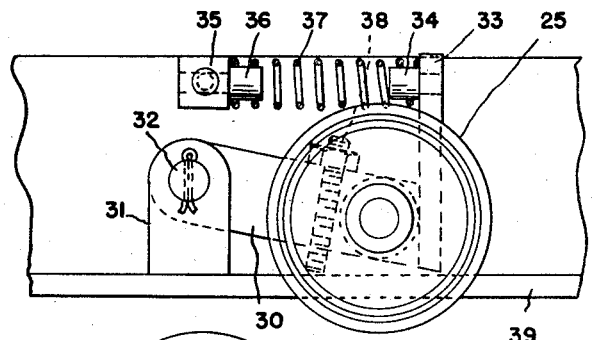
Figure 5:
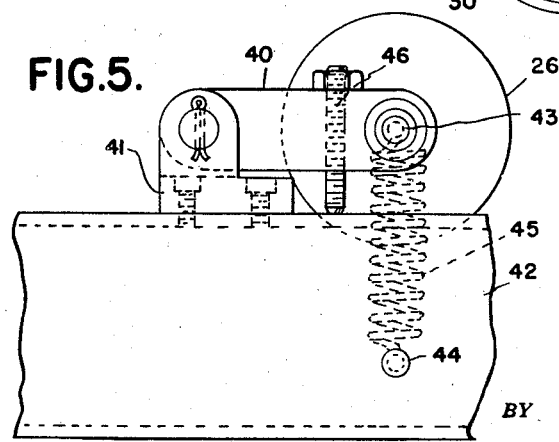
Figures 8, 17:
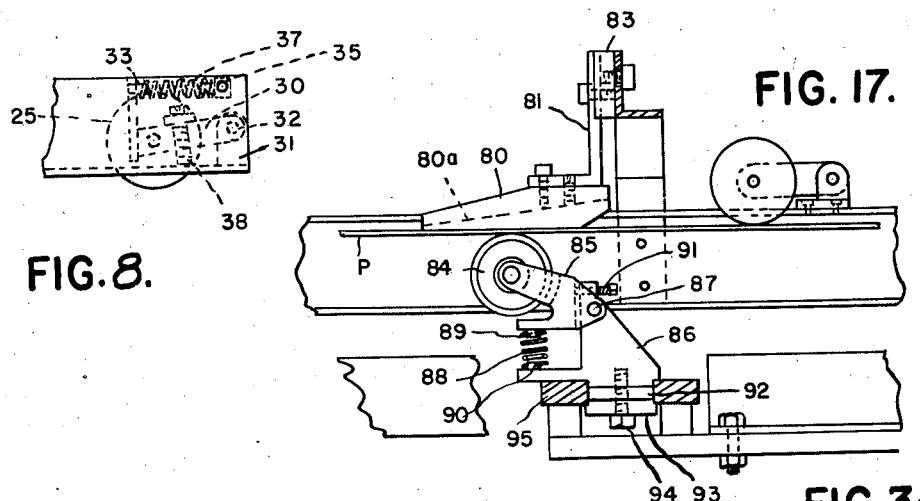
Figures 3A, 18:
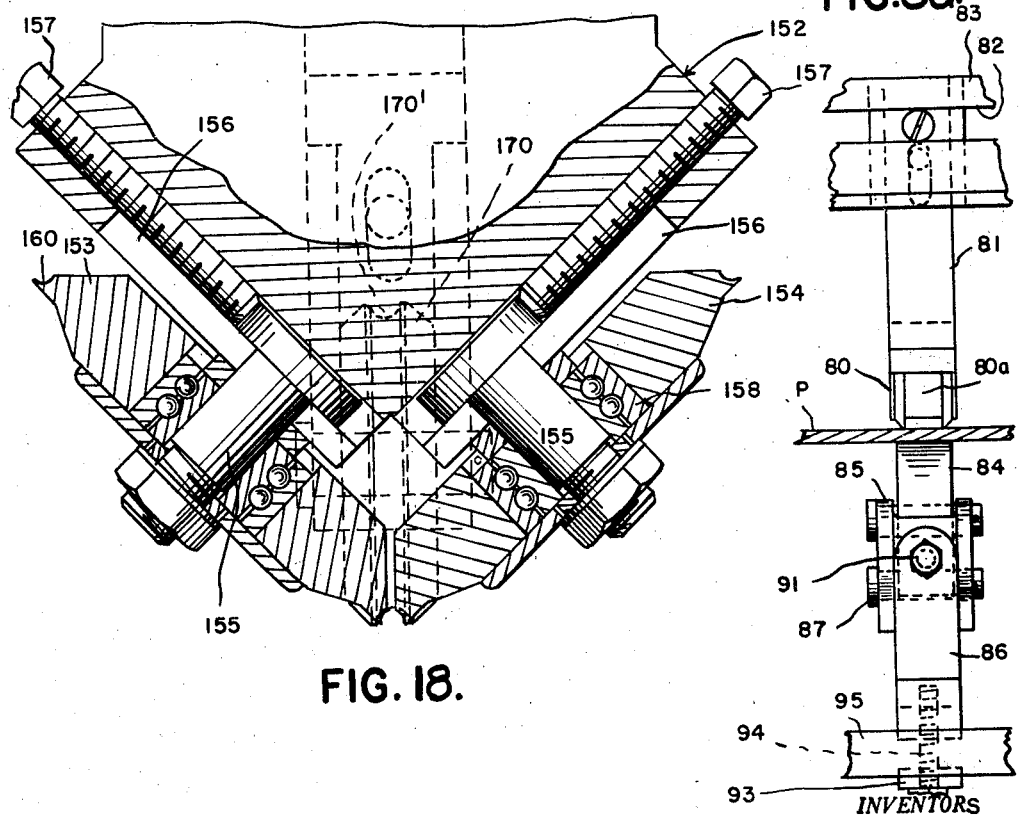

Figure 3a is an enlarged fragmentary elevational view of the guide 80, bracket 86 and associated parts, and showing in section a portion of the trim panel P between the guide 80 and roller 84 carried by the bracket;

Figure 4 is a section on the line 4—4, Figure 1b;

Figure 5 is a detail view taken at the arrow 5, Figure 4;

Figure 6 is a detail view taken at the arrow 6 in Figure 4;

Figure 7 is a detail view, looking in the direction of the arrow 7 in Figure 4;

Figure 8 is an enlarged fragmentary elevational view of one of the rollers 25 and associated parts illustrated in Figure 1a;

Figure 9 is an elevation of a trim panel provided with the decorative molding of the type described;

Figure 10 is a vertical cross sectional view through a trim panel and base strip before being stapled together;

Figure 11 is a view similar to Figure 10 after the parts have been staped together;

Figure 12 is a vertical cross sectional view through an assembled trim panel and base strip and showing the initial position of a cover strip relative to the base strip;

Figure 13 is a view similar to Figure 12 after the cover strip has been pressed down over the base strip;

Figure 14 is a view similar to Figure 12 after the side flanges of the cover strip have been pressed inwardly beneath the outwardly projecting lateral flanges of the base strip;

Figure 15 is a fragmentary section through one end of the molding strip, illustrating this construction;

Figure 16 is a fragmentary section through a molding strip illustrating a somewhat different embodiment of our invention;

Figure 17 is an elevational view with parts broken away and in section of the center piece of the structure illustrated in Figure 1a;

Figure 18 is an enlarged elevational view with parts broken away and in section of the rollers 153, 154 and associated parts;

Figure 19 is a more or less diagrammatic sectional view illustrating a preferred form of the invention, in which the flanges of the cover strip are provided with shallow grooves; and Figure 20 is an enlarged sectional view showing the interlock provided by the groove in the cover strip.

The apparatus which we employ for assembling the molding strips on the trim panels comprises an elongated table 10 supported by a plurality of legs 11 and including cross pieces 12, all assembled together in an obvious manner to provide a rigid elongated supporting table.

Feeding mechanism

Carried by the table 10, adjacent the ends thereof, are sprockets 13 and 14, over which passes a chain 15, the construction of which is best seen in Figure 4. The chain comprises a plurality of links, to the pivot connections of which are secured plates 16 carrying sharp pointed pins 17 adapted to engage the underside of a trim panel P.

In order to rigidly support the upper run of the chain in a horizontal plane, we provide a track member 20 which runs the entire length of the table and which includes a bar 21 (Figure 4) upon which rollers 22 are adapted to ride.

The chain 15 is provided at each side of the table and is adapted to engage the trim panels fed along adjacent the edges thereof.

In order to force the trim panels positively into engagement with the sharp pointed pins 17, we provide a plurality of pressure rollers 25 and 26, which are engageable with the upper side of the trim panels and cause the latter to be firmly engaged by the pins 17 and thereby positively advanced by the chain 15.

Referring particularly to Figure 6, the roller 25 is mounted on a link 30 which, in turn, is pivoted to a bracket 31, as indicated at 32. The link 30 has at one end an upstanding arm 33 provided with a centering stud 34. Secured to the frame of the machine is a cooperating member 35 having a second centering stud 36. A compression spring 37 is sleeved on the studs 34 and 36 and urges the roller 25 downwardly into engagement with the upper surface of each trim panel adjacent the edges thereof. In order to prevent downward movement of the roller 25 beyond a predetermined point, the link 30 is provided with an adjustable stop bolt 38, which is adapted to engage a portion of the supporting angle iron 39, as seen in Figure 6.

As best seen in Figure 5, the roller 26 is carried by the link 40 which is pivoted to brackets 41 mounted on angle irons 42. The spring means for biasing the roller 26 downwardly into engagement with the trim panel comprises a stud 43 mounted on the link 40 and a second stud 44 mounted on angle iron 42. A tension spring 45 interconnects studs 43 and 44 and urges link 30 downwardly. In order to limit downward movement of the link 40, an adjustable stop bolt 46 is provided on the link 40, and is adapted to engage the top of the supporting angle iron 42.

Rollers 25 and 26, (Figure 4) are preferably provided with yieldable surfaces 47 of fibrous material or rubber.

A motor and speed reducer assembly 50 is mounted on a plate 51 and is adapted to rotate a driving sprocket 52. The sprocket 52 drives a chain 53 which, in turn, drives a sprocket 54 keyed or otherwise secured to one part 55 of a clutch assembly, the part 55 being loosely mounted for rotation on the shaft 56. Keyed or otherwise secured to the shaft 56 is a cooperating portion 57 of the clutch assembly adapted to be energized and de-energized by a solenoid 60 having an actuating element 61 (Figure 1b) connected to a yoke 62 pivoted at 63 to a bracket 64. The yoke 62 has openings which receive ears 65 on the shifter member 66 for the portion 57 of the clutch assembly.

The shaft 56 is journaled in blocks 70, 71 and carries at one end thereof in keyed relation, a driving sprocket 72. A chain 73 is reeved on the driving sprocket 72 and on a sprocket 74 keyed or otherwise secured to a shaft 75, which also carries in keyed relation the driving sprocket 14 previously referred to.

As seen in Figures 1a and 3, we provide a guide 80 for the base portions 183 of the molding strips. Preferably this guide 80 is carried by a bracket 81 that is adjustable transversely of the conveyor in a slot 82 formed in a supporting bar 83. This permits adjustment of the guide 80 so as to apply the base strip to the location desired upon the trim panel. Directly beneath the guide 80 is a roller 84 (Figure 1a) mounted on a member 85 pivoted to a supporting bracket 86, as indicated at 87. A compression spring 88 is located between a stud 89 formed on the member 85 and a stud 90 formed on the bracket 86, and biases the roller 84 upwardly into engagement with the underside of the trim panels P. Upward movement of the roller 84 under the influence of the spring 88 is limited by an adjustable stop bolt 91 carried by the bracket 86 and engageable with the member 85. The bracket 86 is adjustable lengthwise of a transversely extending bar 95 (Figures 1a and 3), suitable means for this purpose being indicated generally at 92, and including a clamping plate 93 and clamping bolt 94 adapted to lock bracket 86 in adjusted position relative to said bar 95 when the clamping bolt is tightened.

The underside of the guide 80 has an inverted channel shaped recess 80a, as indicated by dotted lines in Figures 1a and 3 for directing the base strips 183 properly relative to the trim panels P as they advance. Preferably the receiving end of the inverted channel 80a is flared to facilitate the insertion of the base strips into said channel, while the base of the inverted channel inclines downwardly from the receiving end thereof toward its other end.

After being positioned properly relative to the trim panels the base strips 183 are then securely fastened to the trim panels by stapling or wire stitching operations.

After the base strips 183 are fastened to the trim panels, the assembly is carried for a suitable distance by the conveyor with the base strips in exposed condition. At this time the operator takes the channel shaped cover strips 190 (Figs. 10–14) and places them in inverted position over the base strips 183 as illustrated in Fig. 12. As previously stated, these cover strips are preferably so formed as to have a light snap-on engagement with the base strips, although this is not strictly necessary. The cover strips are complete in that their ends are formed and closed to the desired configuration, which would prevent sliding a cover strip on from one end of a base strip.

The mechanism for providing the positive interlock between the cover strip and the base strip is seen in Figures 1b, 4 and 7. As seen in Figure 4, posts 150 are mounted on the table and carry between them a cross piece 151. Adjustably mounted on the cross piece 151 is the roller head 152, which carries a pair of rollers 153 and 154. In Figure 4 the roller 154 is sectioned to show the mounting thereof, and it will be understood that the mounting of the roller 153 is identical. Roller 154 is mounted on a spindle 155 which is adjustable in a T-slot 156. An abutment screw 157 is provided which engages the head of the spindle 155. Suitable bearings indicated generally at 158 are provided for insuring free rotation of the rollers 153 and 154. The rollers 153 and 154 are each provided with an accurately shaped periphery, including a lip 160 which is adapted to bend the downwardly projecting side flanges 191 of the inverted channel shaped cover strip under the outwardly projecting inverted substantially L-shaped flanges 186 of the base strip. The force necessary to bend the flanges 191 of the cover strip 190 underneath the flanges 186 of the base strip 183 is developed by forcing the trim panel and molding strip assembly, past the rollers, thereby imparting rotation to the rollers.

The cover strip 190 is adapted to be engaged and forced downwardly upon the base strip 183 from the position in Figure 12 to the position in Figure 13 by a roller 170, which has its periphery shaped as indicated at 170' to correspond to the contour of the cover strip just prior to engagement of the cover strip by the forming rollers 153 and 154. The roller 170 is carried by a bracket 171 which is vertically adjustable on the roller head 152. A clamping bolt 172 and an adjustable bolt 173 are provided to hold the bracket 171 in adjusted position relative to said head 152.

As best seen in Figure 1b, a roller 175 is provided directly beneath the roller 170 to engage the underside of the trim panel P and to support the same while the roller 170 forces the cover strip down on the base strip. In like manner, the second roller 176 is provided to engage the underside of the panel directly beneath the rolls 153 and 154, so as to hold the trim panel, base strip and cover strip up into firm engagement with the forming rolls 153 and 154.

As will be evident, forming rolls 153 and 154 roll or clamp the flanges 191 of the cover strip underneath the outwardly extending flanges 186 of the base strip 183, so as to provide a permanent interlock. At the same time this permanent interlock is provided without injury to the preferably brightly finished surface of the cover strip.

Reference is now made to Figures 9 to 15. In Figure 9 we have illustrated a trim panel P, which may be of usual type. Trim panels of this type are normally made by covering a fibrous panel board with padding material, and thereafter covering the padding material with a trim fabric which is adhered at its edges to the rear of the panel board. In order to impart a decorative effect to the trim panel P the molding strip assembly 181 is provided, and in Figure 9 we have shown a single one of such strips secured horizontally across substantially the entire width of the trim panel. It will be observed in Figure 9 that the ends of the molding strip assembly are rounded off, as indicated at 182. In Figures 10 to 14 we have indicated successive steps in the assembly of the molding strip on a trim panel P. In Figure 10 we have shown the trim panel P as having a base strip 183 positioned thereon. The base strip 183 has a flat central web 184 and outwardly diverging flanges 185 terminating in downwardly and outwardly inclined flange portions 186.

In Figure 11 we have shown the base strip 183 secured to the trim panel P by suitable means such as wire staples or stitches 187.

In Figure 12 the cover strip 190 is in its initial position on the base strip 183. As previously stated, the cover strip 190 is provided with downwardly and slightly inwardly inclined flanges 191, the arrangement being such with relation to the flange portions 186 of the base strip 183 that the cover strip 190 has a light snap-on engagement therewith. It is only necessary to provide a temporary inter-engagement between these parts, pending the subsequent provision of the permanent interlock. The operator may if desired force the cover strip 190 downwardly, as shown in Figure 13, or this operation may if desired be performed by the roll 170 previously referred to. The next step in the operation is the bending or rolling of the flanges 191, at least partially under the flange portions 186 of the base strip 183. Figure 14 shows the arrangement of molding elements after this step has been completed.

In Figure 15 we have indicated a fragmentary longitudinal section through a molding strip made in accordance with the present invention. In this figure the trim panel P has the base strip 183 stapled thereto, as indicated at 187, and the cover strip 190 is secured in place. As seen in Figure 15, the cover strip 190 has its end rounded off and closed, as indicated by the numeral 192.

By practicing the present invention it is possible to employ a base strip of a relatively inexpensive material, and to employ a light gauge cover strip formed of a more expensive metal if desired. At the same time, it will be appreciated that the cover strip need not necessarily be of metal, but need only be of a sheet material which is adapted to take a permanent set as a result of the molding operation. Thus for example, cover strips formed from certain plastics are suitable.

In Figure 16 we have shown a trim panel P having a base strip 200 formed of metal and provided with upstanding flanges 201. The cover strip 202 is formed from a plastic or other suitable material, and its corners are formed so as to fit under the flanges 201 of the base strip 200. It will be appreciated in this case the locking engagement between the base strip 200 and cover strip 202 depends upon rolling the flanges 201 of the base strip over the corners of the cover strip 202. In Figure 16 the molding strip 202 is solid, but it will be appreciated that the same may be hollow or downwardly concave if desired.

In the foregoing description a disclosure has been made of a pair of opposed, cooperating rollers for bending the flanges of the cover strip down under the flanges of the base strip. It will be apparent that in some cases the cover strip may be initially formed with an inturned flange that may be engaged directly beneath the corresponding flange of the base strip, in which case it will only be necessary to roll the other flange of the cover strip under the adjacent flange of the base strip.

In Figures 19 and 20 we have illustrated a preferred embodiment of the invention, which will now be briefly described. According to this embodiment of the invention the cover strip 275 is provided with grooves 276 along its inner surface at about the point where the inner surface of the cover strip 279 will engage a corner of the base strip. This serves two functions. In the first place, it weakens the cover strip 275 so that when pressure is applied by the rollers the flange of the cover strip will be bent inwardly along the line of weakness, thus providing a more definite interlock. At the same time, the groove thus provided may interfit and engage with the corner of the flange of the base strip.

In Figures 19 and 20 we have shown a somewhat different form of base strip 279, whose function is identical with that previously described.

In Figures 19 and 20 the cover strip 275 is provided at the corner 275a with a longitudinally extending groove 276 which is adapted to receive the outer free edge 277 of the upwardly and outwardly extending flange 278 of the base strip 279. During the rolling operation, the downwardly extending flange 280 of the cover strip 275 is moved from the full line position of Figure 19 to the dotted line position thereof. Due to the groove 276 which provides a line of weakness, the bending of the flange 280 to the dotted line position is concentrated substantially along the line of groove 276. Furthermore, the groove 276 receives the free edge 277 of the base strip, as best seen in Figure 20, so that an interlocking relation between the cover strip 275 and base strip 279 is obtained.

The material of the cover strip 275 is preferably sheet metal, hence the groove 276 will be very shallow. By way of example, excellent results are obtained when the grooves 276 are approximately equal in depth to half the thickness of the material of the cover strip.

While of course the broad invention may be carried out without providing these shallow grooves or lines of weakness, we have found that a much more satisfactory product is obtained when these lines of weakness are provided.

While we have described in considerable detail the specific apparatus for applying molding strips to trim panels, it will be understood that this has been done solely to enable those skilled in the art to practice the present invention, the scope of which is indicated by the appended claims.

What we claim as our invention is:

1. Apparatus for interlocking depending side flanges of an upper inverted channel shaped molding strip to lateral flanges of a lower channel shaped base strip, comprising a solid supporting head having a substantially V shaped portion and provided in advance of said V shaped portion with an upright portion, a bracket slidably mounted on said upright portion, a roller carried by said bracket and having means operable as the strips aforesaid are advanced in superposed relation on a suitable support relative to said head to press the channel shaped molding strip downwardly upon the base strip so that the side flanges of the molding strip will straddle the lateral flanges of the base strip, spindles projecting at substantially right angles from and slidably mounted on the inclined sides of the V shaped portion, and rollers mounted on said spindles and having means operable as the strips aforesaid are advanced in straddling relation on said support relative to said head to bend the side flanges of the molding strip inwardly under the lateral flanges of the base strip to provide an interlock between the parts.

2. Apparatus for interlocking depending side flanges of an upper inverted channel shaped molding strip to lateral flanges of a lower channel shaped base strip, comprising a solid supporting head having a substantially V shaped portion and provided in advance of said V shaped portion with an upright portion, means adjustably mounted on the upright portion and operable as the strips are advanced in superposed relation on a suitable support relative to said head to press the channel shaped molding strip downwardly upon the base strip so that the side flanges of the molding strip will straddle the lateral flanges of the base strip, and cooperating means adjustably mounted on the inclined sides of the V shaped portion and operable as the strips are advanced in straddling relation on said support relative to said head to bend the side flanges of the molding strip inwardly under the lateral flanges of the base strip to provide an interlock between the parts.

3. Apparatus for bending depending substantially parallel side flanges of an upper inverted channel shaped cover strip under laterally projecting flanges of a lower substantially channel shaped base strip to provide an interlock between the parts, comprising a supporting head having downwardly converging sides and provided in advance of said converging sides with an upright side, said converging sides being provided with downwardly extending slots, headed spindles projecting laterally outward from said downwardly converging sides, the heads of said spindles being adjustable lengthwise of said slots, means on the upright side of said supporting head operable when said strips are advanced in superposed relation on a suitable support relative to said supporting head to press the cover strip downwardly upon the base strip to position the depending side flanges of the cover strip in straddling relation beside the lateral flanges of the base strip, means operable when the strips are advanced in straddling relation on said supporting support relative to said head to bend the depending flanges of the cover strip into interlocking relation with the lateral flanges of the base strip, including cooperating rollers rotatably mounted on said spindles and having shaped peripheries including lips engageable with the depending side flanges of the cover strip, and means for adjusting the cooperating rollers relative to each other, including screws threadedly engaging said supporting head and bearing against the heads of said spindles.

4. Apparatus for interlocking depending side flanges of an upper inverted channel shaped molding strip to lateral flanges of a lower channel shaped base strip, comprising a supporting head having inclined surfaces disposed at substantially right angles to each other, spindles projecting outwardly from and disposed at substantially right angles to said surfaces, a pair of cooperating rollers mounted on said spindles and disposed substantially parallel to said inclined surfaces, the peripheries of said rollers being spaced apart below said head, and a single upright roller carried by said head in advance of said cooperating rollers and having its periphery substantially in horizontal alignment with the space aforesaid between the cooperating rollers, the periphery of the single roller having means operable as the strips aforesaid are advanced in superposed relation upon a suitable support relative to said head to press the channel shaped molding strip down upon the base strip so that the side flanges of the molding strip will straddle the lateral flanges of the base strip, the peripheries of said cooperating rollers having means operable as the strips aforesaid are advanced in straddling relation upon said support relative to said head to bend the side flanges of the molding strip inwardly under the lateral flanges of the base strip to provide an interlock between the parts, the single roller being adjustable vertically on said head, the cooperating rollers being adjustable on said head in planes substantially parallel to said inclined surfaces.

5. Apparatus for bending depending substantially parallel side flanges of an upper inverted channel shaped cover strip under laterally projecting flanges of a lower substantially channel shaped base strip to provide an interlock between the parts, comprising a supporting head having downwardly converging sides and provided in advance of said converging sides with an upright side, spindles projecting laterally outward from and adjustably mounted on said downwardly converging sides, a bracket on the upright side of said supporting head, means carried by said bracket and operable when said strips are advanced in superposed relation on a suitable support relative to said supporting head to press the cover strip downwardly upon the base strip to position the depending side flanges of the cover strip in straddling relation beside the lateral flanges of the base strip, cooperating rollers carried by said spindles and operable when the strips are advanced in straddling relation on said support relative to said supporting head to bend the depending flanges of the cover strip into interlocking relation with the lateral flanges of the base strip, and means carried by said supporting head and engageable with said spindles for adjusting the cooperating rollers relative to each other.

6. Apparatus for bending depending substantially parallel side flanges of an upper inverted channel shaped cover strip under laterally projecting flanges of a lower substantially channel shaped base strip to provide an interlock between the parts, comprising a supporting head having downwardly converging sides and provided in advance of said converging sides with an upright side, spindles projecting laterally outward from and adjustably mounted on said downwardly converging sides, a bracket adjustably mounted on the upright side of said supporting head, a roller carried by said bracket and operable when said strips are advanced in superposed relation on a suitable support relative to said supporting head to press the cover strip downwardly upon the base strip to position the depending side flanges of the cover strip in straddling relation beside the lateral flanges of the base strip, and cooperating rollers carried by said spindles and operable when the strips are advanced in straddling relation upon said support relative to said supporting head to bend the depending flanges of the cover strip into interlocking relation with the lateral flanges of the base strip.

7. Apparatus for bending depending substantially parallel side flanges of an upper inverted channel shaped cover strip under laterally projecting flanges of a lower substantially channel shaped base strip to provide an interlock between the parts, comprising a supportnig head having downwardly converging sides and provided in advance of said converging sides with an upright side, said converging sides being provided with downwardly extending slots, headed spindles projecting laterally outward from said downwardly converging sides, the heads of said spindles being adjustable lengthwise of said slots, means on the upright side of said supporting head operable when said strips are advanced in superposed relation on a suitable support relative to said supporting head to press the cover strip downwardly upon the base strip to position the depending side flanges of the cover strip in straddling relation beside the lateral flanges of the base strip, and means operable when the strips are advanced in straddling relation on said support relative to said supporting head to bend the depending flanges of the cover strip into interlocking relation with the lateral flanges of the base strip, including cooperating rollers rotatably mounted on said spindles and having shaped peripheries engageable with the depending side flanges of the cover strip.

8. Apparatus for interlocking depending side flanges of an upper inverted channel shaped molding strip to lateral flanges of a lower channel shaped base strip, comprising a supporting head having inclined surfaces disposed at substantially right angles to each other, spindles projecting outwardly from and disposed at substantially right angles to said surfaces, a pair of cooperating rollers mounted on said spindles and disposed substantially parallel to said inclined surfaces, the peripheries of said rollers being spaced apart below said head, a bracket carried by said head in advance of said cooperating rollers, and a single roller carried by said bracket and having its periphery substantially in horizontal alignment with the space aforesaid between the cooperating rollers, the periphery of the single roller having means operable as the strips aforesaid are advanced in superposed relation upon a suitable support relative to said head to press the channel shaped molding strip down upon the base strip so that the side flanges of the molding strip will straddle the lateral flanges of the base strip, the peripheries of said cooperating rollers having means operable as the strips aforesaid are advanced in straddling relation upon said support relative to said head to bend the side flanges of the molding strip inwardly under the lateral flanges of the base strip to provide an interlock between the parts.

9. Apparatus for bending depending substantially parallel side flanges of an upper inverted channel shaped cover strip under laterally projecting flanges of a lower substantially channel shaped base strip to provide an interlock between the parts, comprising a supporting head having downwardly converging sides and provided in advance of said converging sides with an upright side, spindles projecting laterally outward from said downwardly converging sides, a bracket mounted on the upright side of said supporting head, means carried by said bracket and operable when said strips are advanced in superposed relation on a suitable support relative to said supporting head to press the cover strip downwardly upon the base strip to position the depending side flanges of the cover strip in straddling relation beside the lateral flanges of the base strip, and cooperating rollers carried by said spindles in substantially parallel relation to said converging sides and operable when the strips are advanced in straddling relation upon said support relative to said supporting head to bend the depending flanges of the cover strip into interlocking relation with the lateral flanges of the base strip.

ALVIN C. LIND.
ALEXANDER CARLIN.